United States Patent
Toyoda

(10) Patent No.: US 10,266,136 B2
(45) Date of Patent: Apr. 23, 2019

(54) VEHICLE SUBSTRUCTURE

(71) Applicant: TOYOTA JIDOSHA KABUSHIKI KAISHA, Toyota-shi, Aichi-ken (JP)

(72) Inventor: Kazutoshi Toyoda, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/801,691

(22) Filed: Nov. 2, 2017

(65) Prior Publication Data

US 2018/0141510 A1    May 24, 2018

(30) Foreign Application Priority Data

Nov. 17, 2016   (JP) .................................. 2016-224511

(51) Int. Cl.
  *B60R 16/04*   (2006.01)
  *H01M 2/10*    (2006.01)
  *H01M 2/18*    (2006.01)

(52) U.S. Cl.
  CPC .......... *B60R 16/04* (2013.01); *H01M 2/1016* (2013.01); *H01M 2/1083* (2013.01); *H01M 2/18* (2013.01); *H01M 2220/20* (2013.01)

(58) Field of Classification Search
  CPC ....... B60R 16/04; H01M 2/18; H01M 2/1016; H01M 2/10; H01M 2/1083; H01M 2220/20
  See application file for complete search history.

(56) References Cited

U.S. PATENT DOCUMENTS

| 2,947,373 | A | * | 8/1960 | Wilson | .................... | B60R 16/04 |
| | | | | | | 180/68.5 |
| 3,199,624 | A | * | 8/1965 | Burns | ..................... | B60R 16/04 |
| | | | | | | 180/68.5 |
| 6,230,834 | B1 | * | 5/2001 | Van Hout | ............... | B60R 16/04 |
| | | | | | | 180/68.5 |
| 7,726,427 | B2 | * | 6/2010 | Picavet | ............... | H01M 2/1083 |
| | | | | | | 180/68.5 |

(Continued)

FOREIGN PATENT DOCUMENTS

| DE | 102005055110 A1 | * | 5/2007 | ............. B60R 16/04 |
| EP | 2527205 B1 | * | 10/2015 | ............. B60R 16/04 |

(Continued)

*Primary Examiner* — James A Shriver, II
*Assistant Examiner* — Steve Clemmons
(74) *Attorney, Agent, or Firm* — Oliff PLC

(57) ABSTRACT

A vehicle substructure includes a panel in which an accommodating recessed portion is disposed, a battery holder attached to a bottom surface of the accommodating recessed portion, and a battery attached to the battery holder. The battery includes a first flange portion and a second flange portion. The battery holder includes a carrier on which the battery is mounted, a first clamp portion having the first flange portion interposed between the carrier and the first clamp portion, and a second clamp portion having the second flange portion interposed between the carrier and the second clamp portion. A spacer filled in a space between the first side surface and an inner wall surface of the accommodating recessed portion is disposed between the first side surface and the inner wall surface of the accommodating recessed portion and above the first clamp portion.

11 Claims, 5 Drawing Sheets

(56) References Cited

U.S. PATENT DOCUMENTS

| | | | | |
|---|---|---|---|---|
| 2002/0079152 A1* | 6/2002 | Van Hout | ............... | B60R 16/04 180/68.5 |
| 2012/0025045 A1* | 2/2012 | Meier | ................. | H01M 2/1083 248/229.1 |
| 2013/0189555 A1* | 7/2013 | Munro | .................... | B60R 16/04 429/100 |
| 2017/0174160 A1* | 6/2017 | Uraguchi | ................ | B60R 16/04 |

FOREIGN PATENT DOCUMENTS

| | | | | | |
|---|---|---|---|---|---|
| EP | 2999027 | A1 | * | 3/2016 | .......... H01M 2/1083 |
| FR | 2193261 | A1 | * | 2/1974 | ............ B60R 16/04 |
| JP | 2011-219054 | A | | 11/2011 | |
| JP | 2012119220 | A | * | 6/2012 | |
| JP | 2015042546 | A | * | 3/2015 | |
| JP | 2016-137853 | A | | 8/2016 | |
| JP | 2016168965 | A | * | 9/2016 | |

\* cited by examiner

VEHICLE SUBSTRUCTURE

INCORPORATION BY REFERENCE

The disclosure of Japanese Patent Application No. 2016-224511 filed on Nov. 17, 2016 including the specification, drawings and abstract is incorporated herein by reference in its entirety.

BACKGROUND

1. Technical Field

The disclosure relates to a vehicle substructure.

2. Description of Related Art

Japanese Unexamined Patent Application Publication No. 2016-137853 (JP 2016-137853 A) discloses a vehicle substructure in which a battery 120 is fixed on a battery holder 110 as illustrated in FIG. 7. A battery main body 121 of the battery 120 has the shape of a quadrangular box. A first flange portion 122a protrudes forward from a lower edge of a front side surface 121a of the battery main body 121. A second flange portion 122b protrudes rearward from a lower edge of a rear side surface 121b of the battery main body 121.

The battery holder 110 is provided with a plate-shaped carrier 111 on which the battery 120 is mounted. A front side clamp portion 112 that is bent such that its tip is directed rearward protrudes upward from a front edge of the carrier 111. The front side clamp portion 112 has a tip portion abutting against an upper surface of the first flange portion 122a of the battery 120. The first flange portion 122a of the battery 120 is clamped by the front side clamp portion 112 and the carrier 111. A rear side clamp portion 130 is attached to the carrier 111 by a bolt B. An abutting portion 134 of the rear side clamp portion 130 abuts against an upper surface of the second flange portion 122b of the battery 120. The second flange portion 122b of the battery 120 is clamped by the abutting portion 134 of the rear side clamp portion 130 and the carrier 111.

SUMMARY

The battery 120 in the vehicle substructure that is disclosed in JP 2016-137853 A is likely to be moved forward by inertia when the vehicle collides with an obstacle in front of the vehicle or the vehicle is suddenly stopped. At this time, a moment to lift a rear side part of the battery 120 acts on the battery 120, with the part where the first flange portion 122a and the front side clamp portion 112 abut against each other acting as a fulcrum, as illustrated in FIG. 8. Accordingly, once a large inertial force acts, the second flange portion 122b of the battery 120 and the rear side clamp portion 130 may be disengaged from each other and the battery 120 may be removed from the battery holder 110.

The same can occur in any attachment structure in which a flange portion of a battery is fixed by a clamp as well as the vehicle substructure that is disclosed in JP 2016-137853 A. Depending on the directions in which the clamp portions and the flange portion are disposed, in addition, the same can occur not only in a case where a large inertial force acts on the front side of the vehicle but also in a case where, for example, a large inertial force acts in the width direction of the vehicle.

An aspect relates to a vehicle substructure including a panel in which an accommodating recessed portion recessed to a lower side of a vehicle is disposed, a battery holder attached to a bottom surface of the accommodating recessed portion, and a battery attached to the battery holder. The battery includes a quadrangular box-shaped battery main body, a first flange portion, and a second flange portion, the first flange portion protruding outward from a first side surface and extending along a lower edge of the first side surface, the first side surface being one of four side surfaces of the battery main body, and the second flange portion protruding outward from a second side surface of the battery main body and extending along a lower edge of the second side surface, the second side surface being on a side opposite to the first side surface of the battery main body. The battery holder includes a carrier on which the battery is mounted, a first clamp portion, and a second clamp portion, the first clamp portion abutting against an upper surface of the first flange portion and having the first flange portion interposed between the carrier and the first clamp portion, and the second clamp portion abutting against an upper surface of the second flange portion and having the second flange portion interposed between the carrier and the second clamp portion. A spacer filled in a space between the first side surface and an inner wall surface of the accommodating recessed portion, the spacer being disposed between the first side surface and the inner wall surface of the accommodating recessed portion and being provided above the first clamp portion.

According to the aspect, the first side surface of the battery abuts against the spacer and a movement of the battery to the first clamp side beyond the spacer can be suppressed in a case where the battery is poised to be moved to the first clamp portion side. Accordingly, an excessive movement of the battery to the first clamp side, a reduction in the range of engagement between the second flange portion of the battery and the second clamp portion, and an increase in the likelihood of release of the engagement between the second flange portion of the battery and the second clamp portion can be suppressed. Even if the second flange portion side of the battery is lifted by an inertial force, excessive tilting of the battery can be suppressed since the first side surface of the battery abuts against the spacer. As a result, the battery is not removed from the battery holder.

In the vehicle substructure of the aspect, the spacer may have a facing surface facing a first side surface of the battery and at least a part of the facing surface may be positioned above a centroid of the battery. In a case where the spacer abuts against only a position below the centroid of the battery, the second flange portion side of the battery is lifted in some cases with its part abutting against the spacer acting as a fulcrum. In the configuration described above, at least a part of the facing surface of the spacer is positioned above the centroid of the battery and the spacer abuts against a position above the centroid of the battery. Accordingly, tilting causing the second flange portion side of the battery to be lifted when the battery abuts against the facing surface of the spacer can be appropriately suppressed.

In the vehicle substructure of the aspect, both ends of the facing surface in a width direction of the first side surface may be positioned outside both ends of the first side surface in the width direction of the first side surface. In the configuration described above, the first side surface of the battery abuts against the spacer over the entirety of the width direction when the first side surface of the battery abuts against the facing surface of the spacer. Accordingly, partial contact to the spacer of the first side surface of the battery in the width direction and a change in the direction of the battery can be suppressed.

In the vehicle substructure of the aspect, the spacer may have a spacer main body and a pair of leg portions protruding from the spacer main body to the lower side. A gap between the leg portions in a width direction of the first side surface of the battery main body may exceed a dimension of the first clamp portion in the width direction of the first side surface of the battery main body and the first clamp portion may be disposed between the leg portions. With the configuration described above, the spacer can be mounted on the bottom surface of the accommodating recessed portion without interfering with the first clamp portion.

In the vehicle substructure of the aspect, a grip portion to grip the battery may be disposed on the first side surface of the battery main body. An upper end face of the spacer may be positioned above the grip portion and a recessed portion to expose the grip portion may be disposed in the upper end face of the spacer.

According to the aspect, the grip portion of the battery can be exposed via the recessed portion of the spacer. Accordingly, the grip portion can be gripped by a worker intending to grip the grip portion of the battery and the spacer does not hinder the gripping.

In the vehicle substructure of the aspect, a third flange portion may be disposed on a third side surface of the battery main body, which is adjacent to the first side surface and the second side surface. The third flange portion may protrude outward and extending along a lower edge of the third side surface of the battery main body. The second clamp portion may abut against an upper surface of the third flange portion such that the third flange portion is interposed between the carrier and the second clamp portion. The second clamp portion may have a first abutting portion abutting against the second flange portion and a second abutting portion abutting against the third flange portion and a length of the second abutting portion in a direction along the lower edge of the third side surface may be longer a length of the first abutting portion in the direction along the lower edge of the third side surface.

In a case where the first clamp portion or the battery is deformed, for example, the second flange portion of the battery is moved to the first clamp portion side in some cases. In a case where the movement of the second flange portion of the battery exceeds the length of the part where the second clamp portion and the second flange portion abut against each other, the length being a length in the direction along the lower edge of the third side surface, the second flange portion of the battery is removed from the second clamp portion. According to the aspect, a state where the part of the third flange portion that abuts against the second clamp portion is partially interposed between the second clamp portion and the carrier can be maintained even when the second flange portion of the battery is removed from the second clamp portion. Insofar as the second clamp portion abuts against the upper side of the third flange portion, lifting of the second flange portion side of the battery can be suppressed by the abutting relationship even when the second flange portion is removed from the second clamp portion as described above.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
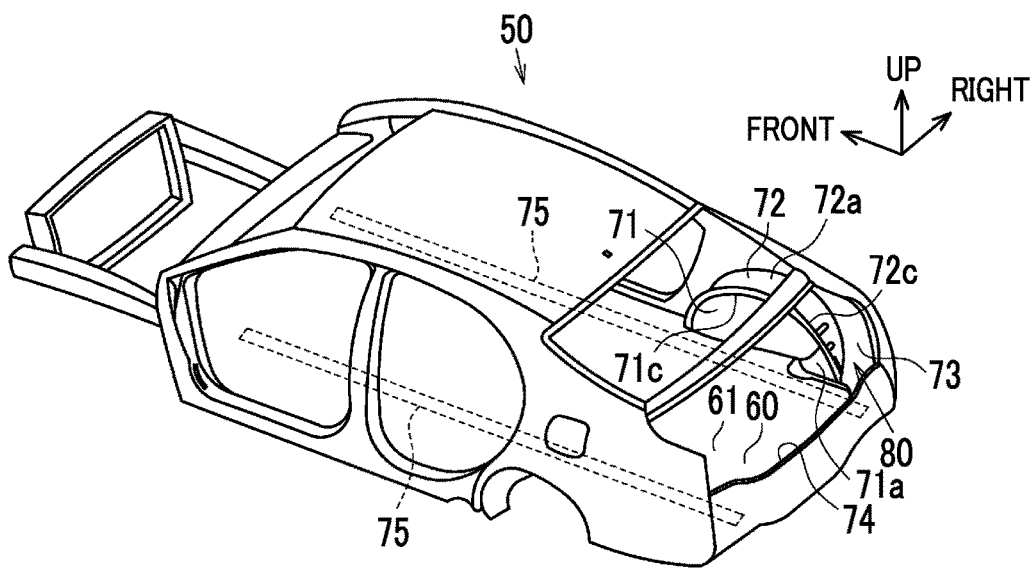
FIG. 1 is a perspective view of a vehicle body frame constituting a vehicle to which a vehicle substructure is applied.

Hereinafter, an embodiment of a vehicle substructure will be described. As illustrated in FIG. 1, a vehicle body frame 50, which is the frame of a vehicle, is provided with a pair of side members 75 separated from each other in the width direction of the vehicle. The side members 75 extend in the front-rear direction of the vehicle. A rear floor panel 60, which has the shape of a plate as a whole, has a lower surface fixed to the upper end faces of the side members 75.

Figure 2:
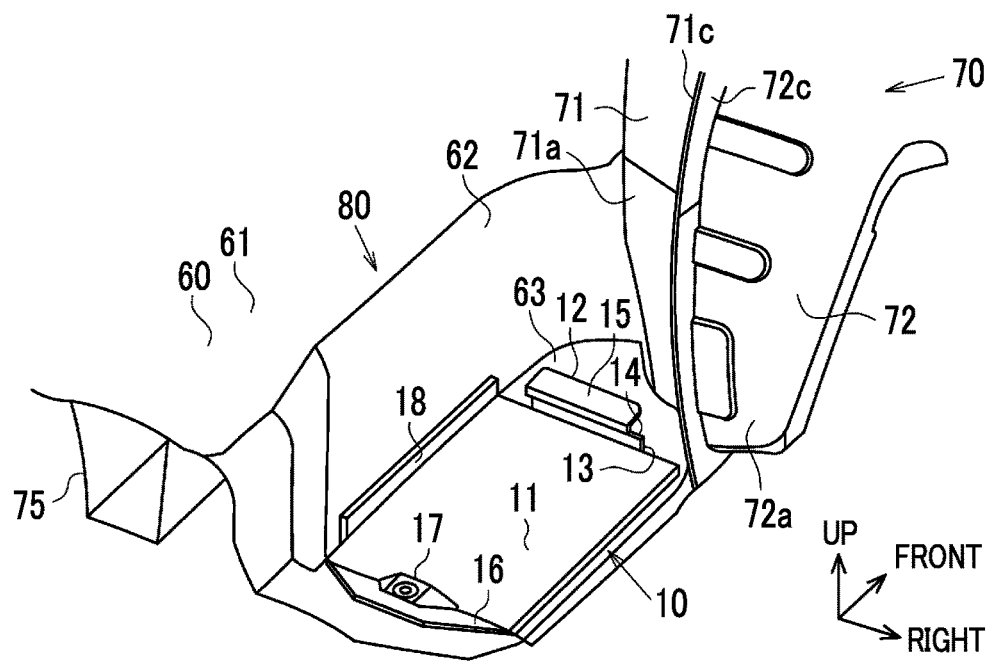
FIG. 2 is a perspective view of an accommodating recessed portion.

As illustrated in FIG. 2, the rear floor panel 60 is provided with an upper wall portion 61 constituting a floor surface in the vehicle cabin. Both outside edges of the upper wall portion 61 in the width direction of the vehicle are outside the respective side members 75 in the width direction of the vehicle. The rear floor panel 60 is also provided with a plate-shaped side wall portion 62 and a plate-shaped lower wall portion 63. The side wall portion 62 extends downward from the outside edge of the upper wall portion 61 in the width direction of the vehicle. The lower wall portion 63 extends outward in the width direction of the vehicle from the lower edge of the side wall portion 62. The side wall portion 62 and the lower wall portion 63 are disposed at a part of both of the side edges of the upper wall portion 61 that is on the rear side in the front-rear direction.

As illustrated in FIG. 1, a plate-shaped lower back panel 74 is fixed to the rear edge of the upper wall portion 61 of the rear floor panel 60. The lower back panel 74 is erected such that it is substantially at a right angle to the upper wall portion 61. A rear bumper (not illustrated) is attached to the rear side surface of the lower back panel 74.

As illustrated in FIG. 2, the vehicle body frame 50 is provided with a wheel house 70 outside the upper wall portion 61 of the rear floor panel 60 in the width direction of the vehicle and on the front sides of the side wall portion 62 and the lower wall portion 63. The wheel house 70 covers a rear tire from above. An inside wheel house 71 and an outside wheel house 72 constitute the wheel house 70. The inside wheel house 71 is positioned on the inner side in the width direction of the vehicle. The outside wheel house 72 is positioned on the outer side in the width direction of the vehicle. The inside wheel house 71 has an arc portion 71a. The arc portion 71a is curved such that its middle side in the front-rear direction has a higher position. The side edge of the inside wheel house 71 that is on the inner side in the width direction of the vehicle is connected to the outside edge of the upper wall portion 61 of the rear floor panel 60 in the width direction of the vehicle and the front edge of the side wall portion 62 of the rear floor panel 60. In addition, the inside wheel house 71 has a rear edge connected to the front edge of the lower wall portion 63 of the rear floor panel 60. A plate-shaped joint 71c extends to the outside in the radial direction of the arc portion 71a from the side edge of the arc portion 71a that is on the outer side in the width direction of the vehicle.

The outside wheel house 72 has an arc portion 72a as is the case with the inside wheel house 71 provided with the arc portion 71a. The arc portion 72a is curved such that its middle side in the front-rear direction has a higher position. A plate-shaped joint 72c extends to the outside in the radial direction of the arc portion 72a from the side edge of the arc portion 72a that is on the inner side in the width direction of the vehicle. The joint 72c of the outside wheel house 72 is joined by welding or the like to the joint 71c of the inside wheel house 71. As illustrated in FIG. 1, the side edge of the arc portion 72a of the outside wheel house 72 that is on the outer side in the width direction of the vehicle and the rear edge of the arc portion 72a of the outside wheel house 72 are connected to a side outer panel 73. The side outer panel 73 constitutes a part of a side surface of the vehicle. The side edge of the lower wall portion 63 of the rear floor panel 60 that is on the outer side in the width direction of the vehicle and the rear edge of the lower wall portion 63 are also connected to the side outer panel 73. The side outer panel 73 is not illustrated in FIG. 2.

In the vehicle body frame 50, an accommodating recessed portion 80 recessed to the lower side of the vehicle is partitioned by the side wall portion 62 and the lower wall portion 63 of the rear floor panel 60, the inside wheel house 71 (arc portion 71a) and the outside wheel house 72 (arc portion 72a) of the wheel house 70, and the side outer panel 73 as illustrated in FIG. 1. In other words, the accommodating recessed portion 80 is positioned outside the side member 75 in the width direction of the vehicle and behind the rear tire and is recessed downward with respect to the upper wall portion 61 of the rear floor panel 60. In addition, the dimension of the accommodating recessed portion 80 in the front-rear direction exceeds the dimension of the accommodating recessed portion 80 in the width direction of the vehicle.

As illustrated in FIG. 2, a battery holder 10 for fixing a battery 20 is attached to the upper surface of the lower wall portion 63. The upper surface of the lower wall portion 63 is the bottom surface of the accommodating recessed portion 80. The battery holder 10 is provided with a carrier 11. The carrier 11 is fixed to the upper surface of the lower wall portion 63. The carrier 11 has the shape of a rectangular plate and has its length in the front-rear direction of the vehicle. The carrier 11 is fixed by welding to the upper surface of the lower wall portion 63.

Figure 5:
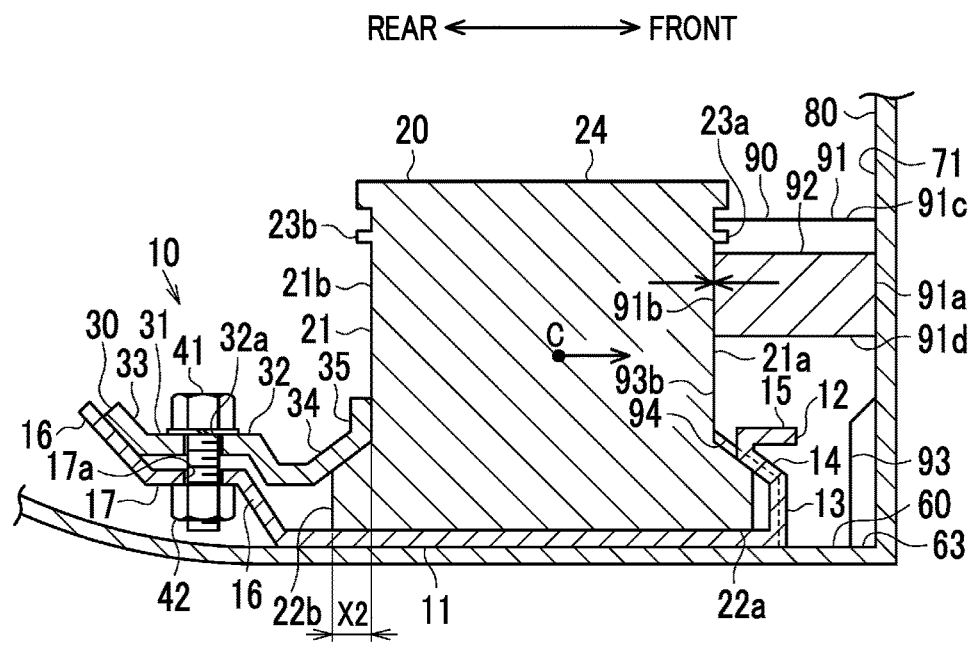
FIG. 5 is a sectional view of the vehicle substructure.

As illustrated in FIGS. 2 and 5, the battery holder 10 is provided with a plate-shaped first clamp portion (front side clamp portion) 12. The front side clamp portion 12 protrudes upward from the front edge of the carrier 11. The front side clamp portion 12 is provided with an upright portion 13. The upright portion 13 extends upward from the front edge of the carrier 11. The upright portion 13 is erected at a right angle to the carrier 11. An abutting portion 14 protrudes obliquely upward and rearward from the upper edge of the upright portion 13. An upper portion 15 protrudes forward from the upper edge (rear edge) of the abutting portion 14. The dimension of the front side clamp portion 12 in the width direction of the vehicle, the front side clamp portion 12 being made up of the upright portion 13, the abutting portion 14, and the upper portion 15 as described above, is smaller than the dimension of the carrier 11 in the width direction of the vehicle. The front side clamp portion 12 is positioned substantially in the middle of the carrier 11 in the width direction of the vehicle. In the present embodiment, the carrier 11 and the front side clamp portion 12 are integrated with each other.

As illustrated in FIGS. 2 and 5, a plate-shaped support plate 16 extends obliquely upward and rearward from the rear edge of the carrier 11. The support plate 16 has a lower surface separated from the upper surface of the lower wall portion 63. The support plate 16 is provided with a pedestal portion 17, which bulges upward, in the middle portion of the support plate 16 in its width direction. The pedestal portion 17 has an upper surface portion parallel to the carrier 11. A bolt hole 17a is disposed in the pedestal portion 17. The bolt hole 17a penetrates the pedestal portion 17 in its thickness direction.

As illustrated in FIG. 2, a plate-shaped side portion 18 protrudes upward from the side edge of the carrier 11 that is on the inner side in the width direction of the vehicle. The side portion 18 is erected perpendicularly to the carrier 11. The side surface of the side portion 18 that is on the inner side in the width direction of the vehicle abuts against the side wall portion 62 of the rear floor panel 60.

Figure 3:
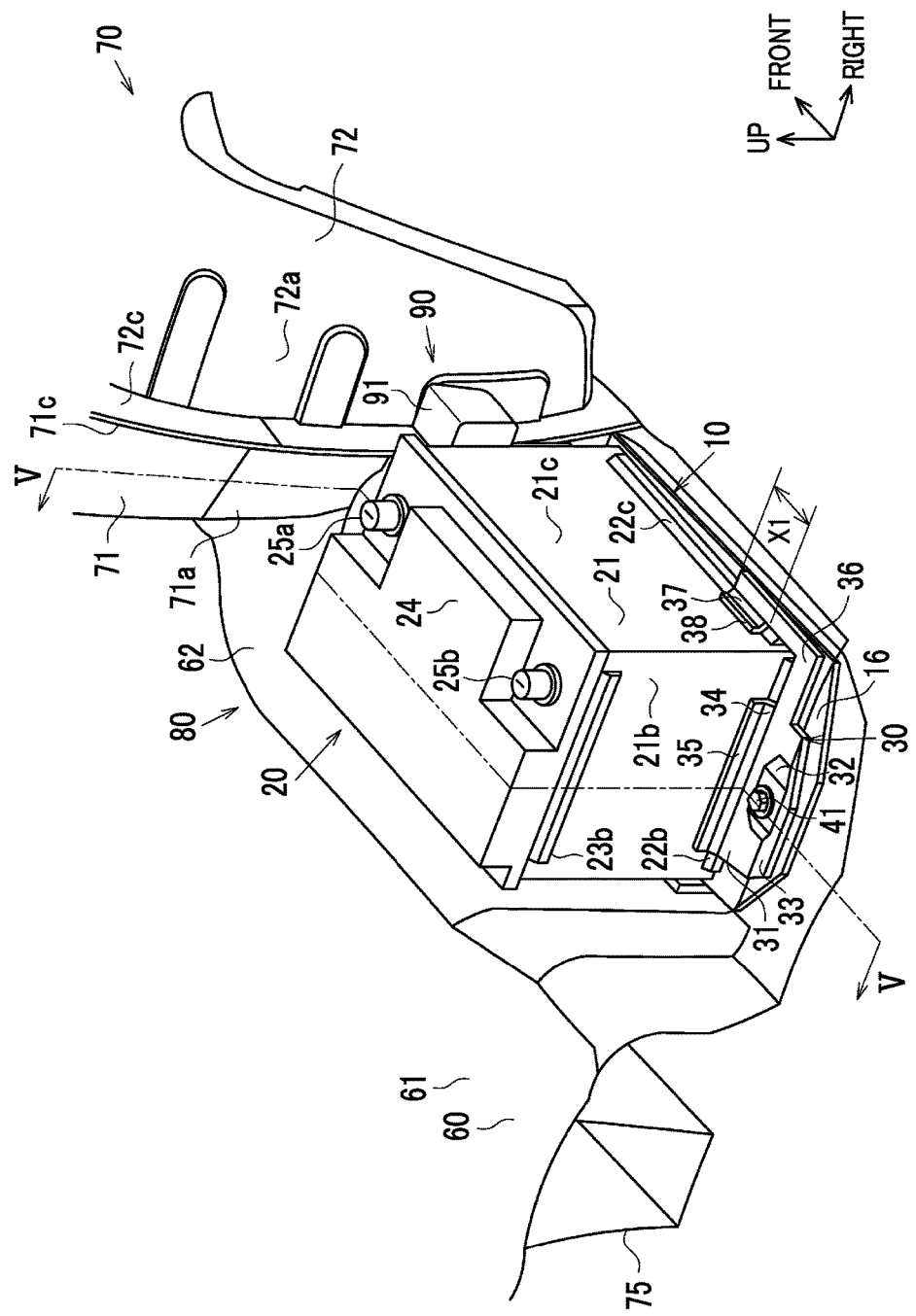
FIG. 3 is a perspective view of the vehicle substructure.

As illustrated in FIGS. 3 and 5, the battery holder 10 is provided with a second clamp portion (rear side clamp portion) 30, which is attached to the support plate 16. The rear side clamp portion 30 is provided with an attachment portion 31, which has a substantially semicircular shape in top view. As illustrated in FIG. 3, a bulging portion 32, which bulges upward, is disposed substantially in the middle of the attachment portion 31. The bulging portion 32 is similar in shape to the pedestal portion 17 of the support plate 16 and allows the pedestal portion 17 of the support plate 16 to be fitted into the lower surface side of the bulging portion 32 of the attachment portion 31. As illustrated in FIG. 5, a bolt hole 32a is disposed in the bulging portion 32 and the bolt hole 32a penetrates the bulging portion 32 in its thickness direction. The attachment portion 31 is provided with a support portion 33. The support portion 33 is shaped such that it warps upward from a part behind the bulging portion 32. The support portion 33 extends obliquely upward and rearward. The support portion 33 has a lower surface abutting against the upper surface of the support plate 16.

As illustrated in FIGS. 3 and 5, the rear side clamp portion 30 is provided with a plate-shaped first abutting portion 34, which extends obliquely upward and forward from the front edge of the attachment portion 31. A plate-shaped first tip portion 35 extends upward from the front edge of the first abutting portion 34. As illustrated in FIG. 3, the rear side clamp portion 30 is provided with a substantially L-shaped connection portion 36 and the connection portion 36 extends to the outside in the width direction of the vehicle from the end portion of the attachment portion 31 that is on the outer side in the width direction of the vehicle and extends forward from its middle. A plate-shaped second abutting portion 37 extends obliquely upward and inward in the width direction of the vehicle from the edge of the connection portion 36 that is on the inner side in the width direction of the vehicle. A plate-shaped second tip portion 38 extends upward from the edge of the second abutting portion 37 that is on the inner side in the width direction of the vehicle. The second abutting portion 37 and the second tip portion 38 have a dimension in the front-rear direction of the vehicle that exceeds the dimension of the first abutting portion 34 in the front-rear direction of the vehicle.

As illustrated in FIG. 3, the battery 20 is mounted on the upper surface of the carrier 11 of the battery holder 10. The battery 20 has a rectangular parallelepiped shape as a whole. The battery 20 is mounted such that its longitudinal direction is along the front-rear direction of the vehicle. The battery 20 is provided with a battery main body 21. The battery main body 21 has the shape of a quadrangular box and a battery fluid or the like is stored in the battery main body 21. As illustrated in FIG. 5, a first flange portion 22a protrudes forward from a first side surface (front side surface) 21a. The front side surface 21a is one of four side surfaces of the battery main body 21 that is on the front side. The first flange portion 22a extends along the lower edge of the front side surface 21a. A second flange portion 22b protrudes rearward from a second side surface (rear side surface) 21b. The rear side surface 21b is the side surface of the battery main body 21 that is on the side opposite to the front side surface 21a (on the rear side). The second flange portion 22b extends along the lower edge of the rear side surface 21b. As illustrated in FIG. 3, a third flange portion 22c protrudes to the outside in the width direction of the vehicle from an outside surface 21c. The outside surface 21c of the battery main body 21 is its side surface that is adjacent to the front side surface 21a and the rear side surface 21b and on the outer side in the width direction of the vehicle. The third flange portion 22c extends along the lower edge of the outside surface 21c. A fourth flange portion protrudes to the inside in the width direction of the vehicle from an inside surface of the battery main body 21. The inside surface of the battery main body 21 is its side surface that is adjacent to the front side surface 21a and the rear side surface 21b and on the inner side in the width direction of the vehicle. The fourth flange portion extends along the lower edge of the inside surface.

As illustrated in FIGS. 3 and 5, the battery 20 is provided with a grip portion 23a on the front side surface 21a of the battery main body 21. The grip portion 23a is for a worker to grip and lift the battery 20. The grip portion 23a protrudes forward from the front side surface 21a and extends in the width direction of the front side surface 21a. The battery 20 is provided with a grip portion 23b on the rear side surface 21b of the battery main body 21 as is the case with the grip portion 23a provided on the front side surface 21a. The grip portion 23b protrudes rearward from the rear side surface 21b and extends in the width direction of the rear side surface 21b. The grip portion 23b on the rear side surface 21b is positioned at the same height as the grip portion 23a on the front side surface 21a.

As illustrated in FIG. 3, the battery 20 is provided with a lid portion 24 on the upper side of the battery main body 21. The lid portion 24 is to block the upper side opening of the battery main body 21. The lid portion 24 substantially has the shape of a plate slightly wider than the battery main body 21 in the front-rear direction of the vehicle and the width direction of the vehicle so that the opening of the battery main body 21 is covered. A pair of terminal portions 25a, 25b is disposed on the upper side of the lid portion 24 and the terminal portions 25a, 25b are separated from each other in the front-rear direction of the vehicle. Cables (not illustrated) are connected to the terminal portions 25a, 25b, respectively. The battery 20 supplies electric power to the vehicle via the cables.

As illustrated in FIG. 5, the first flange portion 22a on the front side surface 21a of the battery 20 is clamped between the carrier 11 of the battery holder 10 and the abutting portion 14 of the front side clamp portion 12.

The rear side clamp portion 30 is disposed on the second flange portion 22b on the rear side surface 21b of the battery 20 and on the upper side of the support plate 16. The bulging portion 32 of the rear side clamp portion 30 is fitted into the pedestal portion 17 of the support plate 16. A nut 42 is attached to the lower side of the pedestal portion 17. A bolt 41 is inserted from the upper side of the rear side clamp portion 30 into the bolt hole 32a in the rear side clamp portion 30 and the bolt hole 17a in the pedestal portion 17 and the bolt 41 is screwed into the nut 42. As a result, the rear side clamp portion 30 is fixed to the pedestal portion 17 and the second flange portion 22b on the rear side surface 21b of the battery 20 is clamped between the carrier 11 of the battery holder 10 and the first abutting portion 34 of the rear side clamp portion 30. In addition, the rear side surface 21b of the battery 20 is brought into surface contact with the first tip portion 35 of the rear side clamp portion 30.

As illustrated in FIG. 3, the third flange portion 22c on the outside surface 21c of the battery 20 is clamped between the carrier 11 of the battery holder 10 and the second abutting portion 37 of the rear side clamp portion 30. The outside surface 21c of the battery 20 is in surface contact with the second tip portion 38 of the rear side clamp portion 30. In addition, in the present embodiment, a rear side part of the third flange portion 22c extending along the lower edge of the outside surface 21c of the battery 20 is clamped between the carrier 11 and the second abutting portion 37. As illustrated in FIGS. 3 and 5, the length X1 of the part where the second abutting portion 37 and the third flange portion 22c abut against each other exceeds the length X2 of the part where the first abutting portion 34 and the second flange portion 22b abut against each other. The length X1 is a length in the front-rear direction of the vehicle (direction along the lower edge of the outside surface 21c). Likewise, the length X2 is a length in the front-rear direction of the vehicle.

Figure 4:
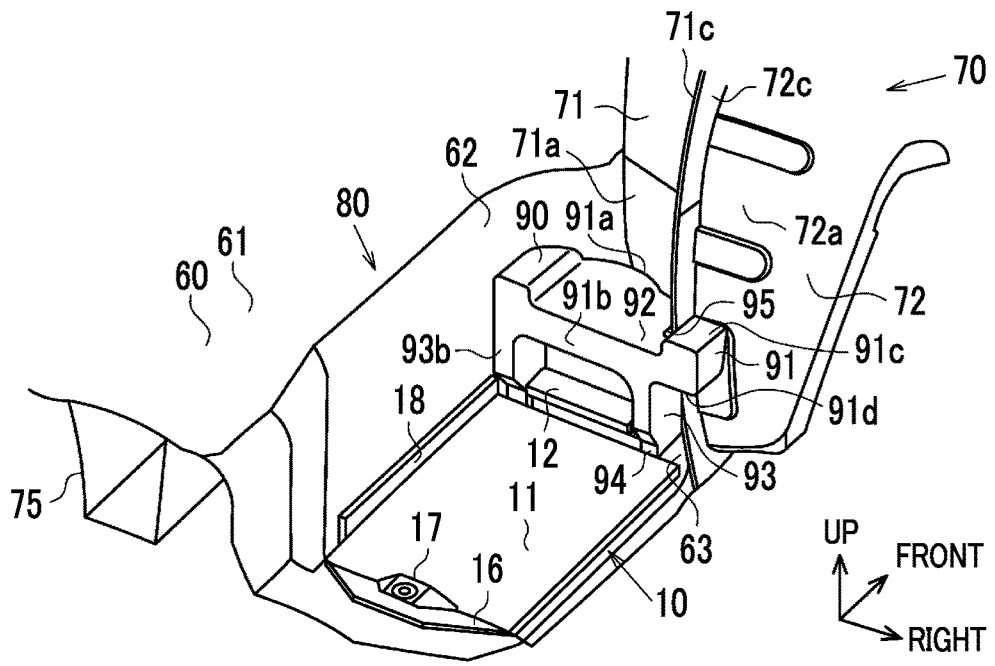
FIG. 4 is a perspective view of the accommodating recessed portion in a state where a spacer is attached.

As illustrated in FIGS. 3 to 5, a spacer 90 is disposed above the front side clamp portion 12. The spacer 90 is to fill the space between the front side surface 21a of the battery 20 and the inner wall surface of the accommodating recessed portion 80. The surface of the side wall portion 62 of the rear floor panel 60 that is on the outer side in the width direction of the vehicle, the surface of the inside wheel house 71 (arc portion 71a) that is on the rear side, the surface of the outside wheel house 72 (arc portion 72a) that is on the rear side, and the surface of the side outer panel 73 that is on the inner side in the width direction of the vehicle constitute the inner wall surface of the accommodating recessed portion 80. In the present embodiment, the spacer 90 is disposed between the front side surface 21a of the battery 20 and two surfaces. One of the two surfaces is the surface of the side wall portion 62 of the rear floor panel 60 that is on the outer side in the width direction of the vehicle and the other one of the two surfaces is the surface of the inside wheel house 71 that is on the rear side.

The spacer 90 is provided with a spacer main body 91 and a pair of leg portions 93. The spacer main body 91 is positioned above the centroid C of the battery 20. The leg portions 93 protrude downward from the spacer main body 91 and support the spacer main body 91. The dimension of the spacer main body 91 in the width direction of the vehicle exceeds the dimension of the front side surface 21a of the battery 20 in the width direction of the vehicle. A part of the spacer main body 91 on the outer side in the width direction of the vehicle is outside the joint 72c of the outside wheel house 72 of the wheel house 70.

As illustrated in FIGS. 4 and 5, a rear end face 91b, which is the surface of the spacer main body 91 that is on the rear side, is a flat surface that faces the front side surface 21a of the battery 20 and follows the shape of the front side surface 21a of the battery 20. Since the spacer main body 91 is positioned above the centroid C of the battery 20, the entire rear end face 91b of the spacer main body 91 is positioned above the centroid C of the battery 20. Both ends of the rear end face 91b of the spacer 90 in the width direction of the vehicle are positioned outside both ends of the front side surface 21a of the battery 20 in the width direction of the vehicle.

A front end face 91a, which is the surface of the spacer main body 91 that is on the front side, protrudes forward and follows the shape of the inner wall surface of the accommodating recessed portion 80. A slit 95 is disposed in the front end face 91a of the spacer main body 91 and the slit 95 extends in the up-down direction. The joint 71c of the inside wheel house 71 and the joint 72c of the outside wheel house 72 are inserted into the slit 95 and the joints 71c, 72c do not interfere with the spacer main body 91.

An upper end face 91c, which is the surface of the spacer main body 91 that is on the upper side, is positioned above the grip portion 23a of the battery 20. A recessed portion 92, which is recessed downward, is disposed in the middle of the upper end face 91c in the width direction of the vehicle. The recessed portion 92 is disposed over the entirety of the spacer main body 91 in the front-rear direction. The recessed portion 92 has a bottom surface positioned below the grip portion 23a of the battery 20. The dimension of the recessed portion 92 in the width direction of the vehicle exceeds the dimension of the grip portion 23a of the battery 20 in the width direction of the vehicle (extension length of the grip portion 23a). As a result, the entire grip portion 23a on the front side of the battery 20 is exposed by the recessed portion 92 in the present embodiment.

The leg portions 93 protrude downward from a lower end face 91d. The lower end face 91d is the surface of the spacer main body 91 that is on the lower side. The leg portions 93 are disposed such that they are separated from each other in the width direction of the vehicle. The gap between the leg portions 93 slightly exceeds the dimension of the front side clamp portion 12 in the width direction of the vehicle.

Rear end faces 93b, which are the surfaces of the leg portions 93 that are on the rear side, are flat surfaces flush with the rear end face 91b of the spacer main body 91. The rear end face 93b of each of the leg portions 93 faces the front side surface 21a of the battery 20 and follows the shape of the front side surface 21a. In the present embodiment, the rear end face 91b of the spacer main body 91 and the rear end faces 93b of the respective leg portions 93 are facing surfaces of the spacer 90. Although a part of the rear end face 91b of the spacer 90 is positioned outside both of the ends of the front side surface 21a of the battery 20 in the width direction of the vehicle, the entire rear end face 91b is included in the facing surfaces since the entire rear end face 91b of the spacer 90 is flat.

Notches 94, which are recessed forward, are disposed in the lower end portions of the rear end faces 93b of the leg portions 93. The notches 94 are formed such that the notches 94 follow the shape of the first flange portion 22a of the battery 20 and do not interfere with the first flange portion 22a.

As illustrated in FIG. 4, the spacer 90 is positioned in the front-rear direction of the vehicle by the front end face 91a of the spacer main body 91 abutting against the inner wall surface of the accommodating recessed portion 80. In addition, the spacer 90 is positioned in the width direction of the vehicle by the leg portions 93 of the spacer 90 being disposed such that the leg portions 93 of the spacer 90 straddle the front side clamp portion 12. In other words, the front side clamp portion 12 is positioned between the leg portions 93 and the spacer main body 91 is positioned on the upper side of the front side clamp portion 12.

Although no gap is illustrated between the front side surface 21a and the rear end faces 91b, 93b in FIG. 5, a gap of approximately 1 mm to 2 mm may be present between the front side surface 21a and each of the rear end faces 91b, 93b. For example, the gaps can result from a dimensional error of the spacer 90, the accommodating recessed portion 80, or the like. It is preferable that a slightly small dimension is set as the dimension of the spacer 90. This is for the spacer 90 to be arranged between the front side surface 21a of the battery 20 and the inner wall surface of the accommodating recessed portion 80 such that the gaps are filled even if the spacer 90, the accommodating recessed portion 80, or the like has a dimensional error.

Hereinafter, the action and effects of the present embodiment will be described with reference to FIGS. 5 and 6. A vehicle substructure to which the spacer 90 is not attached is illustrated in FIG. 6 as a comparative example.

Figure 6:
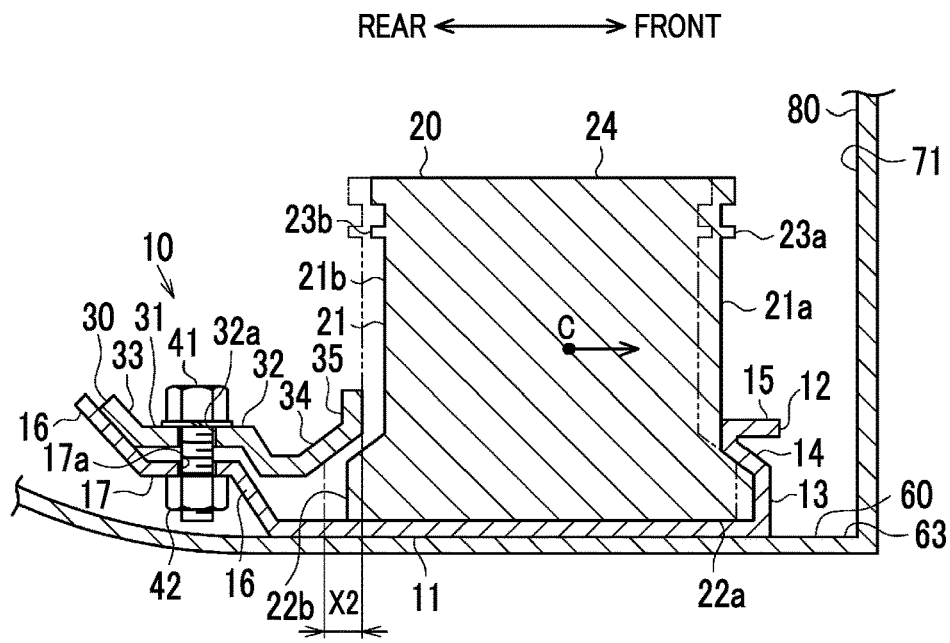
FIG. 6 is an explanatory diagram illustrating a state at a time when an inertial force directed toward the front side of the vehicle acts on a battery in a case where the spacer is not attached.
Figure 7:
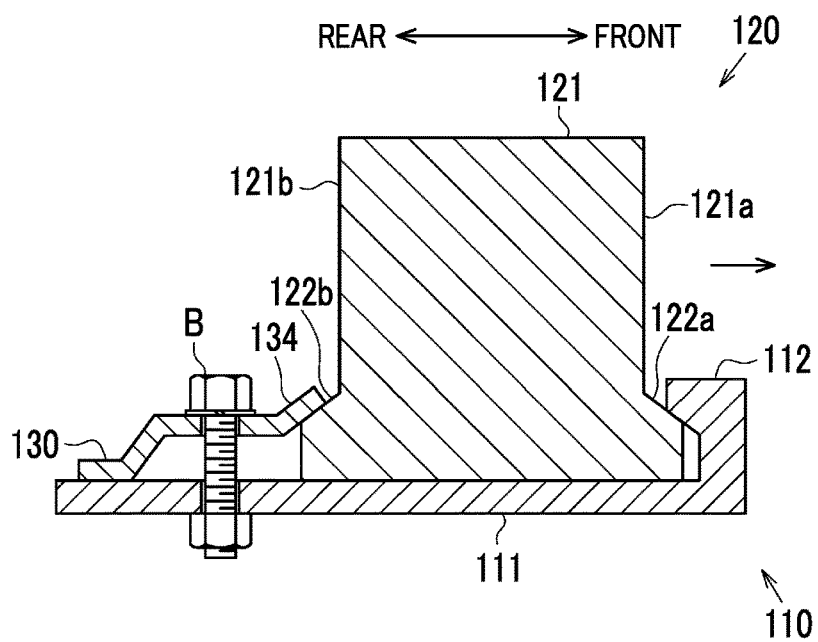
FIG. 7 is a sectional view of a vehicle substructure according to the related art.
Figure 8:
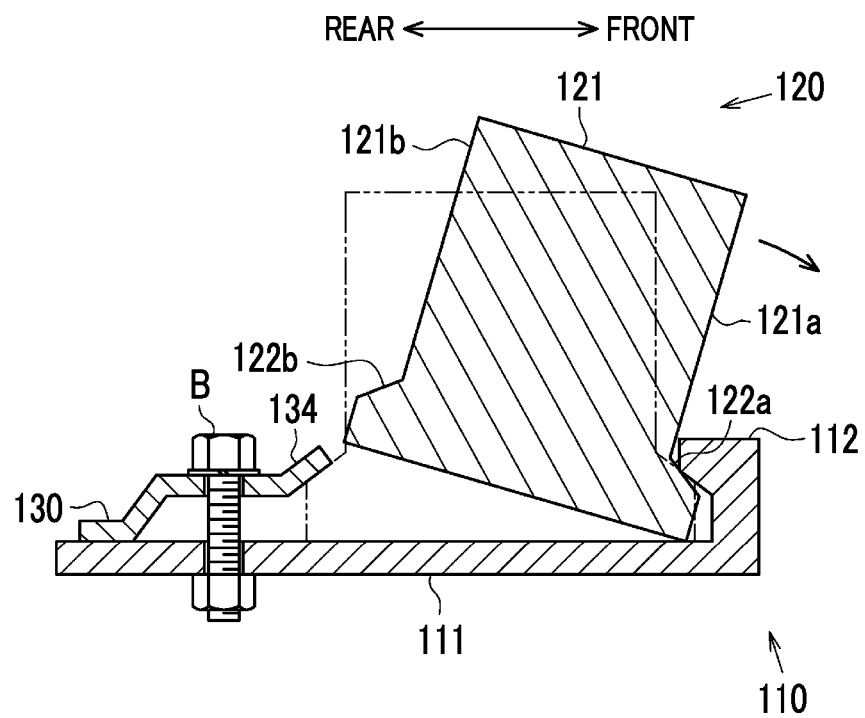
FIG. 8 is an explanatory diagram illustrating a state at a time when an inertial force directed toward the front side of a vehicle acts on a battery in the vehicle substructure according to the related art.

As illustrated in FIG. 6, the battery 20 is likely to be moved forward once a forward inertial force acts on the battery 20 as a result of a sudden stop of the vehicle or the like. At this time, the front side clamp portion 12 may fail to completely endure the inertial force on the battery 20 and may be elastically deformed. As a result, the battery 20 may be moved forward. Then, the second flange portion 22b of the battery 20 is likely to be moved forward and the range of engagement between the second flange portion 22b and the first abutting portion 34 of the rear side clamp portion 30 is likely to be reduced. As a result, the engagement between the second flange portion 22b and the first abutting portion 34 of the rear side clamp portion 30 is likely to be released.

In the present embodiment, the spacer 90 is disposed as illustrated in FIG. 5. Accordingly, once the battery 20 is poised to be moved forward, the front side surface 21a of the battery 20 and the rear end face 91b and the rear end faces 93b of the spacer 90 abut against each other. As a result, the movement of the battery 20 is suppressed by the abutting against the spacer 90. As a result, an excessive forward movement of the battery 20, a reduction in the range of engagement between the second flange portion 22b of the battery 20 and the first abutting portion 34 of the rear side clamp portion 30, and an increase in the likelihood of release of the engagement between the second flange portion 22b of the battery 20 and the first abutting portion 34 of the rear side clamp portion 30 can be suppressed.

Once the first flange portion 22a of the battery 20 abuts against the upright portion 13 of the front side clamp portion 12 as illustrated in FIG. 6, the battery 20 cannot be moved forward beyond the upright portion 13 of the front side clamp portion 12. Once an additional forward inertial force acts on the battery 20 in this state, the battery 20 may be elastically deformed and compressed forward as illustrated by the solid line in FIG. 6. Even in this case, the second flange portion 22b of the battery 20 is moved forward and the range of engagement between the second flange portion 22b and the first abutting portion 34 of the rear side clamp portion 30 is reduced. The two-dot chain line in FIG. 6 shows a state where the forward inertial force is yet to act on the battery 20. In FIG. 6, the degree to which the battery main body 21 is compressed is illustrated in an exaggerated manner.

In a case where the distance of forward movement of the second flange portion 22b exceeds the length X2 of the part where the first abutting portion 34 of the rear side clamp portion 30 and the second flange portion 22b abut against each other, the length X2 being a length in the front-rear direction of the vehicle (direction along the lower edge of the outside surface 21c), the second flange portion 22b of the battery 20 is not clamped by the rear side clamp portion 30.

In this regard, the rear side clamp portion 30 according to the present embodiment is provided with the second abutting portion 37 as well as the first abutting portion 34. The length X1 of the part where the second abutting portion 37 of the rear side clamp portion 30 and the third flange portion 22c of the battery 20 abut against each other exceeds the length X2 of the part where the first abutting portion 34 of the rear side clamp portion 30 and the second flange portion 22b of the battery 20 abut against each other. The length X1 is a length in the front-rear direction of the vehicle (direction along the lower edge of the outside surface 21c). The length X2 is a length in the front-rear direction of the vehicle (direction along the lower edge of the outside surface 21c). Accordingly, a state where the second abutting portion 37 of the rear side clamp portion 30 and the third flange portion 22c of the battery 20 abut against each other can be maintained even when the first abutting portion 34 of the rear side clamp portion 30 and the second flange portion 22b of the battery 20 do not abut against each other. In other words, a state can be maintained where the rear side part of the third flange portion 22c is clamped between the carrier 11 and the second abutting portion 37 of the rear side clamp portion 30.

Once a forward inertial force acts on the battery 20 in a state where the first flange portion 22a of the battery 20 and the front side clamp portion 12 of the battery holder 10 abut against each other, a moment to lift the rear side of the battery 20 acts with the part where the first flange portion 22a and the front side clamp portion 12 abut against each other acting as a fulcrum.

In a case where such a moment acts on the battery 20 with the spacer 90 not attached as illustrated in FIG. 6, the second flange portion 22b of the battery 20 may be removed from the battery holder 10, the second flange portion 22b side of the battery 20 may be lifted, and the battery 20 may fall forward. The battery 20 is particularly likely to fall when the range of engagement between the second flange portion 22b and the first abutting portion 34 of the rear side clamp portion 30 is reduced and the engagement between the second flange portion 22b and the first abutting portion 34 of the rear side clamp portion 30 is likely to be released as described above. Once the battery 20 falls, an excessive force may be applied to the cables connected to the terminal portions 25a, 25b of the battery 20 or the cables may be removed from the respective terminal portions 25a, 25b.

In the present embodiment, a force acts from the battery 20 side to the spacer 90 side, with the front side surface 21a of the battery 20 and the rear end face 91b and the rear end faces 93b of the spacer 90 abutting against each other as illustrated in FIG. 5, when the battery 20 is poised to be tilted and the front side surface 21a is poised to fall forward.

The front end face 91a of the spacer 90 abuts against the rear floor panel 60 and the inside wheel house 71 as a part of the inner wall surface of the accommodating recessed portion 80. Accordingly, the spacer 90 is supported by the inner wall surface of the accommodating recessed portion 80. As a result, tilting of the battery 20 can be suppressed by the spacer 90 even when a moment to tilt the battery 20 acts. Even if the second flange portion 22b of the battery 20 is lifted to some extent by an inertial force, excessive tilting of the battery 20 can be suppressed since the front side surface 21a of the battery 20 abuts against the spacer 90. As a result, the battery 20 is not removed from the battery holder 10. Since the battery 20 is not removed from the battery holder 10, removal of the cables from the terminal portions 25a, 25b of the battery 20 that is attributable to falling of the battery 20 can be suppressed.

In a case where the spacer 90 abuts against only a position below the centroid C of the battery 20, a moment to lift the rear side of the battery 20 may act with its part abutting against the spacer 90 acting as a fulcrum. In the present embodiment, the rear end face 91b of the spacer main body 91 of the spacer 90 is positioned above the centroid C of the battery 20 in this regard. Accordingly, even when a moment to tilt the battery 20 acts, the front side surface 21a of the battery 20 abuts against the rear end face 91b of the spacer 90, which is positioned above the centroid C of the battery 20. Accordingly, when the battery 20 abuts against the rear end face 91b of the spacer main body 91, no moment is likely to be generated to lift the rear side of the battery 20 with the abutting part acting as a fulcrum. By the configuration being adopted, tilting causing the second flange portion 22b side of the battery 20 to be lifted can be appropriately suppressed.

Both of the ends of the rear end face 91b of the spacer 90 in the width direction of the vehicle are positioned outside both of the ends of the front side surface 21a of the battery 20 in the width direction of the vehicle. Accordingly, when the front side surface 21a of the battery 20 abuts against the rear end face 91b of the spacer 90, the front side surface 21a of the battery 20 abuts against the rear end face 91b of the spacer 90 over the entirety of the width direction of the vehicle. Accordingly, partial contact to the spacer 90 of the front side surface 21a of the battery 20 in the width direction of the vehicle and a change in the direction of the battery 20 in the longitudinal direction can be suppressed.

For falling and tilting of the battery 20 to be effectively suppressed, it is preferable that the spacer 90 and the battery 20 abut against each other with the facing surfaces of the spacer 90 provided above and as far away as possible from the front side clamp portion 12. The battery 20, however, is provided with the grip portion 23a on the front side surface 21a. Accordingly, if the spacer 90 is disposed on the front side of the grip portion 23a, the spacer 90 will act as a hindrance and the grip portion 23a will be difficult to be gripped by a worker intending to grip the grip portion 23a of the battery 20. When the battery 20 is taken out by the worker, for example, he or she needs to move the spacer 90 beforehand in order to grip the grip portion 23a of the battery 20.

The spacer 90 is provided with the recessed portion 92 on the front side of the grip portion 23a of the battery 20. Accordingly, the grip portion 23a of the battery 20 can be exposed upward with the upper end face 91c of the spacer 90 positioned above the grip portion 23a. As a result, the grip portion 23a can be gripped by a worker intending to grip the grip portion 23a of the battery 20 and the spacer 90 does not hinder the gripping.

The gap between the leg portions 93 of the spacer 90 slightly exceeds the dimension of the front side clamp portion 12 in the width direction of the vehicle and the spacer 90 is disposed such that the leg portions 93 straddle the front side clamp portion 12. As a result, the spacer 90 is positioned in the width direction of the vehicle. Accordingly, a member for attachment does not have to be used and fixing by means of an adhesive or the like does not have to be performed for the spacer 90 to be positioned between the front side surface 21*a* of the battery 20 and the inner wall surface of the accommodating recessed portion 80.

The present embodiment can be changed as follows.

In the present embodiment, the front side surface 21*a* of the battery 20 is its first side surface, the rear side surface 21*b* of the battery 20 is its second side surface, the outside surface 21*c* of the battery 20 is its third side surface, and the spacer 90 is disposed only between the front side surface 21*a* of the battery 20 and the inner wall surface of the accommodating recessed portion 80. However, the spacer may also be disposed in another gap.

The spacer 90 may also be disposed above the first abutting portion 34 and the first tip portion 35 of the rear side clamp portion 30 and between the rear side surface 21*b* of the battery 20 and the inner wall surface of the accommodating recessed portion 80 with the rear side surface 21*b* of the battery 20 acting as the first side surface. In this case, rearward falling of the battery 20 can be suppressed.

In a case where the fourth flange portion and the third flange portion 22*c* of the battery 20 are clamped by the clamp portions of the battery holder 10, the spacer 90 to fill the space between the inside surface of the battery 20 and the inner wall surface of the accommodating recessed portion 80 may be disposed with the inside surface of the battery 20 acting as the first side surface. In this case, falling of the battery 20 to the inner side in the width direction of the vehicle can be suppressed.

The spacer 90 to fill the space between the outside surface 21*c* of the battery 20 and the inner wall surface of the accommodating recessed portion 80 may be disposed with the outside surface 21*c* of the battery 20 acting as the first side surface. In this case, falling of the battery 20 to the outer side in the width direction of the vehicle can be suppressed.

In the present embodiment, the rear end face 91*b* of the spacer main body 91 of the spacer 90 is positioned above the centroid C of the battery 20. However, the rear end face 91*b* of the spacer 90 may be positioned below the centroid C of the battery 20 as well. In other words, the surface of the spacer 90 that faces the battery 20 may be present only below the centroid C of the battery 20. Even in this case, forward falling of the battery 20 can be suppressed insofar as the front side surface 21*a* of the battery 20 abuts against the rear end face 91*b* of the spacer 90.

In the present embodiment, both of the ends of the rear end face 91*b* of the spacer 90 in the width direction of the vehicle are positioned outside both of the ends of the front side surface 21*a* of the battery 20 in the width direction of the vehicle. However, the embodiment is not limited thereto. For example, the dimension of the battery 20 in the width direction of the vehicle may exceed the dimension of the spacer main body 91 of the spacer 90 in the width direction of the vehicle. Even in this case, forward falling of the battery 20 can be suppressed insofar as a part of the front side surface 21*a* of the battery 20 is capable of abutting against the rear end face 91*b* and the rear end faces 93*b* of the spacer 90.

In the present embodiment, the gap between the leg portions 93 of the spacer 90 slightly exceeds the dimension of the front side clamp portion 12 in the width direction of the vehicle, the spacer 90 is disposed such that the leg portions 93 straddle the front side clamp portion 12, and the spacer 90 is positioned in the width direction of the vehicle as a result. However, the embodiment is not limited thereto. For example, the spacer 90 can also be positioned in the width direction of the vehicle by the dimension of the accommodating recessed portion 80 in the width direction of the vehicle slightly exceeding the dimension of the spacer 90 in the width direction of the vehicle.

The leg portions 93 of the spacer 90 may be omitted. Even if the leg portions 93 are omitted, the spacer 90 can still be disposed above the front side clamp portion 12 if, for example, the spacer 90 (spacer main body 91) is directly mounted on the upper surface of the upper portion 15 of the front side clamp portion 12. In addition, the spacer 90 (spacer main body 91) can be arranged above the clamp portion by a member for attachment being used or fixing by means of an adhesive or the like being performed for positioning between the battery 20 and the inner wall surface of the accommodating recessed portion 80.

In the present embodiment, the spacer 90 is provided with the recessed portion 92 over the entirety of the spacer main body 91 in the front-rear direction. However, the embodiment is not limited thereto. For example, the grip portion 23*a* can still be exposed upward even when the recessed portion 92 of the spacer 90 is provided only on the rear side of the spacer main body 91 insofar as the recessed portion 92 reaches the rear end face 91*b* of the spacer main body 91.

In the present embodiment, the spacer 90 is provided with the recessed portion 92. However, the spacer 90 may not be provided with the recessed portion 92 when the upper end face 91*c* of the spacer 90 is positioned below the grip portion 23*a* of the battery 20. When the battery 20 does not have the grip portion 23*a*, omission of the recessed portion 92 of the spacer 90 has no particular negative effect.

In the present embodiment, the grip portion 23*a* protrudes forward from the front side surface 21*a*. However, the embodiment is not limited thereto. The grip portion 23*a* may be recessed rearward from the front side surface 21*a* as well. Even in this case, it is desirable that the grip portion 23*a* is exposed by the recessed portion 92 of the spacer 90.

In the present embodiment, the rear side clamp portion 30 is provided with the connection portion 36, the second abutting portion 37, and the second tip portion 38. However, the rear side clamp portion 30 may not be provided with the connection portion 36, the second abutting portion 37, and the second tip portion 38, either. In other words, the rear side clamp portion 30 may clamp only the second flange portion 22*b* of the battery 20.

In the present embodiment, the carrier 11 and the front side clamp portion 12 of the battery holder 10 are integrated with each other. However, the embodiment is not limited thereto. For example, an alternative configuration may be adopted in which the front side clamp portion 12 as a component separate from the carrier 11 is fastened to the carrier 11 with a bolt. In addition, the carrier 11, the support plate 16, the pedestal portion 17, and the rear side clamp portion 30 of the battery holder 10 may be integrated in this case.

In the present embodiment, the accommodating recessed portion 80 is configured to be positioned behind the rear tire. However, the embodiment is not limited thereto. For example, the accommodating recessed portion 80 may be disposed in the middle of the rear floor panel 60 in the width direction of the vehicle.

What is claimed is:

1. A vehicle substructure comprising:
a panel in which an accommodating recessed portion recessed to a lower side of a vehicle is disposed;
a battery holder attached to a bottom surface of the accommodating recessed portion; and
a battery attached to the battery holder, wherein:
the battery includes a quadrangular box-shaped battery main body, a first flange portion, and a second flange portion, the first flange portion protruding outward from a first side surface and extending along a lower edge of the first side surface, the first side surface being one of four side surfaces of the battery main body, and the second flange portion protruding outward from a second side surface of the battery main body and extending along a lower edge of the second side surface, the second side surface being on a side opposite to the first side surface of the battery main body;
the battery holder includes a carrier on which the battery is mounted, a first clamp portion, and a second clamp portion, the first clamp portion abutting against an upper surface of the first flange portion and having the first flange portion interposed between the carrier and the first clamp portion, and the second clamp portion abutting against an upper surface of the second flange portion and having the second flange portion interposed between the carrier and the second clamp portion;
the vehicle substructure further includes a spacer filled in a space between the first side surface and an inner wall surface of the accommodating recessed portion, the spacer being disposed between the first side surface and the inner wall surface of the accommodating recessed portion and being provided above the first clamp portion;
the spacer has a facing surface facing the first side surface of the battery and at least a part of the facing surface is positioned above a centroid of the battery; and
both ends of the facing surface in a width direction of the first side surface are positioned outside both ends of the first side surface in the width direction of the first side surface.

2. The vehicle substructure according to claim 1, wherein:
the spacer has a spacer main body and a pair of leg portions protruding from the spacer main body to the lower side; and
a gap between the leg portions in the width direction of the first side surface of the battery main body exceeds a dimension of the first clamp portion in the width direction of the first side surface of the battery main body and the first clamp portion is disposed between the leg portions.

3. The vehicle substructure according to claim 1, wherein:
a grip portion to grip the battery is disposed on the first side surface of the battery main body and an upper end face of the spacer is positioned above the grip portion; and
a recessed portion to expose the grip portion is disposed in the upper end face of the spacer.

4. The vehicle substructure according to claim 1, wherein:
the battery includes a third flange portion disposed on a third side surface of the battery main body, which is adjacent to the first side surface and the second side surface, the third flange portion protruding outward and extending along a lower edge of the third side surface of the battery main body;
the second clamp portion abuts against an upper surface of the third flange portion such that the third flange portion is interposed between the carrier and the second clamp portion; and
the second clamp portion has a first abutting portion abutting against the second flange portion and a second abutting portion abutting against the third flange portion and a length of the second abutting portion in a direction along the lower edge of the third side surface is longer than a length of the first abutting portion in the direction along the lower edge of the third side surface.

5. A vehicle substructure comprising:
a panel in which an accommodating recessed portion recessed to a lower side of a vehicle is disposed;
a battery holder attached to a bottom surface of the accommodating recessed portion; and
a battery attached to the battery holder, wherein:
the battery includes a quadrangular box-shaped battery main body, a first flange portion, and a second flange portion, the first flange portion protruding outward from a first side surface and extending along a lower edge of the first side surface, the first side surface being one of four side surfaces of the battery main body, and the second flange portion protruding outward from a second side surface of the battery main body and extending along a lower edge of the second side surface, the second side surface being on a side opposite to the first side surface of the battery main body;
the battery holder includes a carrier on which the battery is mounted, a first clamp portion, and a second clamp portion, the first clamp portion abutting against an upper surface of the first flange portion and having the first flange portion interposed between the carrier and the first clamp portion, and the second clamp portion abutting against an upper surface of the second flange portion and having the second flange portion interposed between the carrier and the second clamp portion;
the vehicle substructure further includes a spacer filled in a space between the first side surface and an inner wall surface of the accommodating recessed portion, the spacer being disposed between the first side surface and the inner wall surface of the accommodating recessed portion and being provided above the first clamp portion;
the spacer has a spacer main body and a pair of leg portions protruding from the spacer main body to the lower side; and
a gap between the leg portions in a width direction of the first side surface of the battery main body exceeds a dimension of the first clamp portion in the width direction of the first side surface of the battery main body and the first clamp portion is disposed between the leg portions.

6. The vehicle substructure according to claim 5, wherein the spacer has a facing surface facing the first side surface of the battery and at least a part of the facing surface is positioned above a centroid of the battery.

7. The vehicle substructure according to claim 5, wherein:
a grip portion to grip the battery is disposed on the first side surface of the battery main body and an upper end face of the spacer is positioned above the grip portion; and a recessed portion to expose the grip portion is disposed in the upper end face of the spacer.

8. The vehicle substructure according to claim 5, wherein:
the battery includes a third flange portion disposed on a third side surface of the battery main body, which is adjacent to the first side surface and the second side surface, the third flange portion protruding outward and extending along a lower edge of the third side surface of the battery main body;
the second clamp portion abuts against an upper surface of the third flange portion such that the third flange portion is interposed between the carrier and the second clamp portion; and
the second clamp portion has a first abutting portion abutting against the second flange portion and a second abutting portion abutting against the third flange portion and a length of the second abutting portion in a direction along the lower edge of the third side surface is longer than a length of the first abutting portion in the direction along the lower edge of the third side surface.

9. A vehicle substructure comprising:
a panel in which an accommodating recessed portion recessed to a lower side of a vehicle is disposed;
a battery holder attached to a bottom surface of the accommodating recessed portion; and
a battery attached to the battery holder, wherein:
the battery includes a quadrangular box-shaped battery main body, a first flange portion, and a second flange portion, the first flange portion protruding outward from a first side surface and extending along a lower edge of the first side surface, the first side surface being one of four side surfaces of the battery main body, and the second flange portion protruding outward from a second side surface of the battery main body and extending along a lower edge of the second side surface, the second side surface being on a side opposite to the first side surface of the battery main body;
the battery holder includes a carrier on which the battery is mounted, a first clamp portion, and a second clamp portion, the first clamp portion abutting against an upper surface of the first flange portion and having the first flange portion interposed between the carrier and the first clamp portion, and the second clamp portion abutting against an upper surface of the second flange portion and having the second flange portion interposed between the carrier and the second clamp portion;
the vehicle substructure further includes a spacer filled in a space between the first side surface and an inner wall surface of the accommodating recessed portion, the spacer being disposed between the first side surface and the inner wall surface of the accommodating recessed portion and being provided above the first clamp portion;
a grip portion to grip the battery is disposed on the first side surface of the battery main body and an upper end face of the spacer is positioned above the grip portion; and
a recessed portion to expose the grip portion is disposed in the upper end face of the spacer.

10. The vehicle substructure according to claim 9, wherein the spacer has a facing surface facing the first side surface of the battery and at least a part of the facing surface is positioned above a centroid of the battery.

11. The vehicle substructure according to claim 9, wherein:
the battery includes a third flange portion disposed on a third side surface of the battery main body, which is adjacent to the first side surface and the second side surface, the third flange portion protruding outward and extending along a lower edge of the third side surface of the battery main body;
the second clamp portion abuts against an upper surface of the third flange portion such that the third flange portion is interposed between the carrier and the second clamp portion; and
the second clamp portion has a first abutting portion abutting against the second flange portion and a second abutting portion abutting against the third flange portion and a length of the second abutting portion in a direction along the lower edge of the third side surface is longer than a length of the first abutting portion in the direction along the lower edge of the third side surface.

* * * * *